United States Patent
Inoue et al.

(10) Patent No.: US 9,136,791 B2
(45) Date of Patent: Sep. 15, 2015

(54) MOTOR DRIVING DEVICE, INTEGRATED CIRCUIT DEVICE, MOTOR APPARATUS AND MOTOR DRIVING SYSTEM

(75) Inventors: Tomohiro Inoue, Tokyo (JP); Keiichi Katayama, Nagano (JP); Shuhei Nishi, Nagano (JP)

(73) Assignee: Minebea Co., Ltd., Nagano (JP)

( * ) Notice: Subject to any disclaimer, the term of this patent is extended or adjusted under 35 U.S.C. 154(b) by 1 day.

(21) Appl. No.: 13/480,894

(22) Filed: May 25, 2012

(65) Prior Publication Data
US 2012/0299523 A1    Nov. 29, 2012

(30) Foreign Application Priority Data
May 27, 2011    (JP) ................................. 2011-118829

(51) Int. Cl.
H02P 1/04    (2006.01)
G06F 13/14    (2006.01)
H02P 31/00    (2006.01)

(52) U.S. Cl.
CPC ..................................... *H02P 31/00* (2013.01)

(58) Field of Classification Search
USPC ....................... 318/400.9, 111, 558
See application file for complete search history.

(56) References Cited

U.S. PATENT DOCUMENTS

| | | | | |
|---|---|---|---|---|
| 5,025,414 A | * | 6/1991 | Iwamoto | 710/305 |
| 5,252,902 A | * | 10/1993 | Uehara et al. | 318/599 |
| 6,028,263 A | * | 2/2000 | Kobayashi et al. | 136/201 |
| 6,944,703 B2 | * | 9/2005 | Okaue et al. | 710/301 |
| 8,862,802 B2 | * | 10/2014 | Calvin et al. | 710/110 |
| 2003/0095618 A1 | * | 5/2003 | Iseki | 375/354 |
| 2007/0108932 A1 | * | 5/2007 | Takahashi et al. | 318/568.13 |
| 2009/0119437 A1 | * | 5/2009 | Hilscher | 710/305 |
| 2009/0185442 A1 | * | 7/2009 | Pyeon et al. | 365/220 |

(Continued)

FOREIGN PATENT DOCUMENTS

| | | |
|---|---|---|
| JP | 2000-324896 A | 11/2000 |
| JP | 2002-044982 A | 2/2002 |

(Continued)

OTHER PUBLICATIONS

Office Action issued on Nov. 11, 2014 in the corresponding JP Patent Application 2011-118829.

*Primary Examiner* — Paul Ip
*Assistant Examiner* — Devon Joseph
(74) *Attorney, Agent, or Firm* — Carrier Blackman & Associates, P.C.; Joseph P. Carrier; William D. Blackman (57) ABSTRACT

A motor driving device includes a communication path selection unit, to which operation command information for controlling driving of a motor is input in a serial data format or a parallel data format via a common input path, a communication unit which includes a serial interface unit for the serial data format and a parallel interface unit for the parallel data format, and outputs a control signal based on the operation command information input via the communication path selection unit, and a driving control unit which controls driving of the motor based on the control signal. The communication path selection unit selects between outputs path to the serial interface unit and the parallel interface unit, which corresponds to the data format of the input operation command information, and outputs the input operation command information to the serial interface unit or the parallel interface unit through the selected output path.

9 Claims, 6 Drawing Sheets

(56) References Cited

U.S. PATENT DOCUMENTS

| | | | |
|---|---|---|---|
| 2009/0195206 A1* | 8/2009 | Aoyama et al. | 318/600 |
| 2010/0123423 A1* | 5/2010 | Campbell et al. | 318/600 |
| 2010/0295951 A1* | 11/2010 | Silverbrook et al. | 348/207.2 |
| 2011/0031906 A1* | 2/2011 | Yasohara et al. | 318/66 |
| 2011/0080125 A1* | 4/2011 | Shimada et al. | 318/400.09 |
| 2011/0301755 A1* | 12/2011 | Anderson | 700/246 |

FOREIGN PATENT DOCUMENTS

| | | |
|---|---|---|
| JP | 2004-173369 A | 6/2004 |
| JP | 2004-173370 A | 6/2004 |
| JP | 2008-263678 A | 10/2008 |

* cited by examiner

MOTOR DRIVING DEVICE, INTEGRATED CIRCUIT DEVICE, MOTOR APPARATUS AND MOTOR DRIVING SYSTEM

BACKGROUND OF THE INVENTION

1. Field of the Invention

The present invention relates to a motor driving device, an integrated circuit device, a motor apparatus and a motor driving system, and more particularly, to a motor driving device an integrated circuit device, a motor apparatus and a motor driving system which drive a motor based on operation command information transmitted from a higher-level device.

2. Description of the Related Art

Regarding a method of transmitting operation command information about an operation of a motor from a higher-level device such as microcomputer to a motor driving device, there have been known a method employing a parallel data format using a parallel bus and a method employing a serial data format using a serial bus.

For example, JP-B-4,023,299 discloses a method of transmitting data in a parallel data format via a parallel bus between a higher-level device and a motor driving device.

Also, JP-A-2000-324896 discloses a method of transmitting data in a serial data format via a serial bus between a higher-level device and a motor driving device.

JP-A-2008-263678 discloses a servo motor control device which performs serial communication between a CPU substrate and a servo substrate and bi-directionally converts serial data into parallel data in the servo substrate.

Those data transmission methods respectively have advantages and disadvantages. Any one of those methods is adopted in a motor driving system which transmits operation command information from a higher-level device to a motor apparatus to drive a motor. According to the parallel data format method disclosed in JP-B-4,023,299, when the number of motor to be controlled, i.e., the number of the motor driving devices is two or more, a problem may occur. That is, the number of wirings for transmitting the operation command information to the respective motor control devices is obtained by multiplying the number of the operation command information by the number of the motor control devices. Therefore, the number of wirings is increased in a device having a plurality of motors mounted therein. As a result, it is necessary to provide a space for mounting the wirings, and thus it is difficult to make the device having the motors mounted therein smaller and to reduce the space. Also, the faulty wiring may be caused due to the increase in the number of the wirings.

The serial data format method disclosed in JP-A-2000-324896 may solve the problem occurring in the method disclosed in JP-B-4,023,299. However, in general, the serial data format transmission requires longer transmission time than the parallel data format transmission. Thus, when all control on the higher-level device and the motor driving device is performed through the serial data format, the overall performance of the system may be lowered.

As described above, the data transmission method between the higher-level device and the motor driving device includes the serial data format method and the parallel data format method. Regarding this, a motor driving device having different specification is required depending on which method is used to transmit the data.

That is, in a case where a motor is mounted in some apparatus, when a higher-level device of the apparatus outputs the operation command information of the motor by the parallel data format, it is necessary to use a motor driving device complying with the parallel data format transmission method. On the other hand, when the higher-level device outputs the operation command information of the motor by the serial data format, it is necessary to use a motor driving device complying with the serial data format transmission method. Therefore, regarding the motor driving device, it is necessary to provide a plurality of types complying with the parallel data format transmission method and the serial data format transmission method. As a result, the manufacturing cost of the motor driving device is increased due to the increase of the type of the motor driving device.

The above problem is particularly remarkable in a motor apparatus having integrated a motor and a motor driving device for driving the motor. That is, in this case, it is necessary to differently handle a motor apparatus complying with the parallel data format transmission method and a motor apparatus complying with the serial data format transmission method and it is not possible to use each motor apparatus in the other apparatus having the different transmission method and to commonly use the same.

SUMMARY OF THE INVENTION

The present invention has been made to solve the above problems, and an object of the present invention is to provide a motor driving device, an integrated circuit device, a motor apparatus and a motor driving system which can cope with any of a serial data format and a parallel data format of operation command information input from a higher-level device.

According to an illustrative embodiment of the present invention, there is provided a motor driving device comprising: a communication path selection unit, to which operation command information for controlling driving of a motor is input in either of a serial data format and a parallel data format; a communication unit which includes a serial interface unit for inputting the operation command information in the serial data format, and a parallel interface unit for inputting the operation command information in the parallel data format, and which outputs a driving control signal based on the operation command information input via the communication path selection unit; and a driving control unit which controls driving of the motor based on the driving control signal output from the communication unit. The communication path selection unit is input with the operation command information via a common input path, irrespective of the data formats. The communication path selection unit selects between an output path to the serial interface unit and an output path to the parallel interface unit, which corresponds to the data format of the input operation command information, and outputs the input operation command information to either one of the serial interface unit and the parallel interface unit through the selected output path.

The above motor driving device may further comprise a storage or memory which stores communication path selection command information based on the data format of the input operation command information, and the communication path selection unit may select the output path based on the communication path selection command information stored in the storage and the data format of the input operation command information.

In the above motor driving device, the storage may be provided to the driving control unit and further stores information to be used for controlling of the driving control unit.

In the above motor driving device, when a number of signals of the operation command information in the parallel data format exceeds a number of the common input path, a part of the signals of the operation command information in the parallel data format may be directly input to the communication unit without via the communication path selection unit.

According to another illustrative embodiment of the present invention, there is provided an integrated circuit device comprising one or more integrated circuits which implement a part or a whole of the above motor driving device.

In the above integrated circuit device, one of the integrated circuits may implement at least the communication path selection unit and the communication unit.

In the above integrated circuit device, one of the integrated circuits may implement a whole of the motor driving device.

According to a further illustrative embodiment of the present invention, there is provided a motor apparatus comprising: a motor, and the above motor driving device. The motor driving device controls driving of the motor based on operation command information which is input to the motor apparatus from outside, e.g., from a higher-level device.

According to a further illustrative embodiment of the present invention, there is provided a motor driving system comprising: the above motor apparatus; and a higher-level device which controls the motor apparatus. The higher-level device outputs either one of the operation command information in the serial data format and the operation command information in the parallel data format, to the motor apparatus for controlling the motor apparatus.

According to the above configuration, the communication path selection unit is input with the operation command information through the common input path, irrespective of the data formats, and the communication path selection unit selects the output path, based on the data format of the operation command information, and outputs the operation command information to either one of the serial interface unit and the parallel interface unit. Therefore, it is possible to provide a motor driving device, an integrated circuit device, a motor apparatus and a motor driving system which can cope with any of the serial data format and the parallel data format of the operation command information input from the higher-level device.

DETAILED DESCRIPTION

Hereinafter, a motor driving device and a motor driving system adopting the same according to illustrative embodiments of the present invention will be described.

[First Illustrative Embodiment]

First, a motor driving device according to a first illustrative embodiment is described.

A motor driving device configures a motor apparatus together with a motor which is driven by the motor driving device. That is, the motor and the motor driving device are integrally combined to configure the motor apparatus. The motor apparatus is used for a variety of devices such as information device (for example, office automation devices such as a copier).

The motor apparatus is input with operation command information for controlling driving of the motor, which is output from a higher-level device. In the motor apparatus, the motor driving device controls the driving of the motor based on the operation command information input from the outside.

Figure 1:
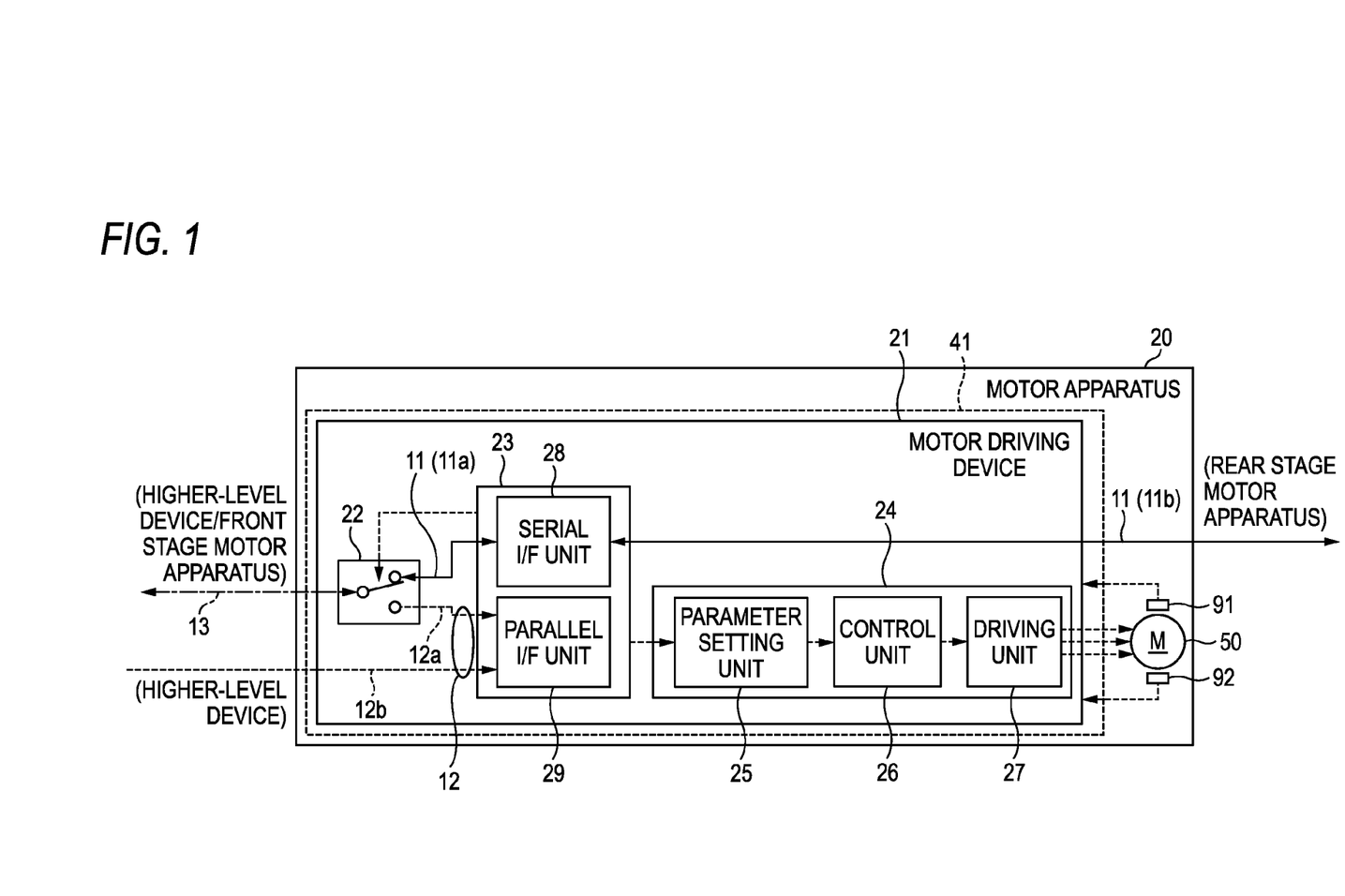
FIG. 1 is a block diagram of a motor apparatus having a motor driving device according to a first illustrative embodiment of the present invention.

FIG. 1 is a block diagram of a motor apparatus 20 having a motor driving device 21 according to a first illustrative embodiment of the present invention.

As shown in FIG. 1, the motor apparatus 20 has the motor driving device 21, a motor 50, a speed detection device 91 and a position detection device 92.

The motor 50 is a brushless DC motor, for example. The motor 50 has a movable member (not shown) and a three-phase coil (not shown) of U, V and W phases, for example. A driving voltage is supplied from the motor driving device 21 to each winding. That is, the motor 50 is driven according to the driving voltage supplied from the motor driving device 21. In this illustrative embodiment, the motor driving device 21 drives the motor 50 by a sinusoidal wave driving.

The speed detection device 91 and the position detection device 92 are disposed in the vicinity of the motor 50. The speed detection device 91 detects a rotating speed (for example, revolution per unit time) of the motor 50 and outputs a speed detection signal indicative of the detected speed to the motor driving device 21. The position detection device 92 detects a rotational position of the movable member of the motor 50 and outputs a position detection signal indicative of the detected position to the motor driving device 21. The motor driving device 21 controls the driving of the motor 50 based on the speed detection signal and the position detection signal.

The motor driving device 21 includes a communication path selection unit 22, a communication unit 23 and a driving control unit 24. In this illustrative embodiment, the motor driving device 21 is configured as an integrated circuit device 41 which includes the communication path selection unit 22, the communication unit 23 and the driving control unit 24, and all of the constitutional elements are integrated therein. In other words, the motor driving device 21 is packaged as one integrated circuit device 41 which is an integrated circuit (IC). The integrated circuit device 41 may include the other circuits, in addition to the circuits configuring the motor driving device 21.

The integrated circuit device 41 is arranged on a printed substrate, for example, so that the motor driving device 21 is configured. In the motor apparatus 20, the printed substrate configuring the motor driving device 21 is embedded in the motor 50 or integrated with the motor 50. That is, since the motor driving device 21 is configured as the integrated circuit device 41, it is possible to reduce the cost thereof. Also, since the motor driving device 21 is configured as the integrated circuit device 41, it is possible to make the motor apparatus 20 smaller.

As shown in FIG. 1, the communication unit 23 includes a serial interface unit (serial I/F unit) 28 and a parallel interface unit (parallel I/F unit) 29.

The serial interface unit 28 is connected with a serial communication path 11. As the serial communication path 11, there are provided a serial communication path 11a (an example of an output path to the serial interface unit 28) which connects the communication path selection unit 22 and the serial interface unit 28 each other and a serial communication path 11b which can be connected to a rear stage motor apparatus. In the meantime, the rear stage motor apparatus refers to a motor apparatus which, when a plurality of motor apparatuses 20 including the above motor apparatus 20 is connected in series to the higher-level device, is arranged at a rear stage (a side distant (downstream) from the higher-level device) of the motor apparatus, as described below.

The parallel interface unit 29 is connected with a parallel communication path 12. As the parallel communication path 12, there are provided a parallel communication path 12a (an example of an output path to the parallel interface unit 29) which connects the communication path selection unit 22 and the parallel interface unit 29 each other and a parallel communication path 12b which can be connected to the higher-level device (which will be described later). That is, the parallel interface unit 29 is provided with the communication path which can be directly connected to the higher-level device through the parallel communication path 12b without being routed via the communication path selection unit 22.

The communication path selection unit 22 is connected with the serial communication path 11 and the parallel communication path 12, which are the output paths. That is, the communication path selection unit 22 and the communication unit 23 are connected to each other through the serial communication path 11 and the parallel communication path 12. The communication path selection unit 22 and the serial interface unit 28 are connected to each other through the serial communication path 11. The communication path selection unit 22 and the parallel interface unit 29 are connected to each other through the parallel communication path 12.

The communication path selection unit 22 is connected with an input path 13. The communication path selection unit 22 is connected to the higher-level device or a front stage motor apparatus through the input path 13. In the meantime, the front stage motor apparatus refers to a motor apparatus which, when a plurality of motor apparatuses 20 including the above motor apparatus 20 is connected in series to the higher-level device, is arranged at a front stage (a side close (upstream) to the higher-level device) of the motor apparatus, as described below.

In this illustrative embodiment, when the operation command information is output from an input device, the operation command information is input to the communication path selection unit 22 through the input path 13. The operation command information is input to the communication unit 23 through the serial communication path 11a or parallel communication path 12a via the communication path selection unit 22. Also, a part of the operation command information may be input from the input device, to which the motor driving device 21 is connected, to the communication unit 23 through the parallel communication path 12b.

The communication unit 23 outputs a driving control signal to the driving control unit 24 based on the operation command information input to the serial interface unit 28 or parallel interface unit 29. The communication unit 23 includes, for example, a circuit for data processing and the like, in addition to the serial interface unit 28 and the parallel interface unit 29. The communication unit 23 performs, for example, signal conversion processing for the operation command information input to the serial interface unit 28 and transmits the driving control signal to the driving control unit 24 based on data transmitted to the communication unit 23.

The driving control unit 24 controls the driving of the motor based on the driving control signal output from the communication unit 23.

As shown in FIG. 1, the driving control unit 24 includes a parameter setting unit 25, a control unit 26 and a driving unit 27.

The parameter setting unit 25 is input with the driving control signal output from the communication unit 23. The parameter setting unit 25 classifies the input driving control signal into various data such as control parameter and driving parameter of the motor 50. Also, the parameter setting unit 25 stores the classified data into an internal or external memory and the like (sets the parameters and the like). That is, the parameter setting unit 25 functions as a storage which stores the parameters and the like for driving the motor 50.

In the meantime, the data which is stored in the parameter setting unit 25 is as follows, for example. That is, there is setting data about the control operation of the driving control unit 24, such as data indicative of a control parameter such as control gain corresponding to a rotating speed of the motor 50 and a detection range of the rotating speed. Also, there is setting data about the driving operation, such as data indicative of an advance angle value corresponding to the rotating speed, a waveform driving the motor 50 and a type of a pulse width modulation method. Also, there is setting data about an inverter operation, such as data indicative of a dead time period, a frequency of the pulse width modulation and a switch speed of a power transistor. In addition to the above data, setting data about a delay time period at the time of activation, setting data about a protective operation, setting data about a series of operations of activating, deactivating and re-activating the motor 50, setting data for driving the motor 50 in an energy saving mode, and the like may be included.

The control unit 26 controls the rotating speed of the motor 50 and also controls the respective units of the motor apparatus 20. For example, the control unit 26 processes basic operations of the motor apparatus 20 and performs a feedback request which requests data transmission from the higher-level device. Also, the control unit 26 reads out the control parameter and the like of the data stored in the parameter setting unit 25, which relates to the driving operation of the motor 50, and performs the control based on the control parameter and the like. The control unit 26 generates a speed control signal by using the control parameter for rotation control of the motor 50 such as control gain, thereby controlling the rotating speed of the motor 50.

The driving unit 27 generates a sinusoidal wave driving signal, based on the speed control signal generated from the control unit 26, for example, and supplies the driving voltage to the coil of the motor 50, based on the sinusoidal wave driving signal.

The sinusoidal wave driving signal is generated using a pulse width modulation (PWM) circuit, for example. That is, a sinusoidal waveform signal is generated which has an amplitude corresponding to the speed control signal and a phase corresponding to the position detection signal output from the position detection device 92. The driving unit 27 performs the pulse width modulation by the generated signal and generates a driving pulse signal. The generated driving pulse signal is supplied to an inverter, as the sinusoidal wave driving signal.

The inverter converts direct current power into alternating current driving power, according to the sinusoidal wave driving signal, and generates a driving voltage of the motor 50.

Thereby, the driving voltage having a pulse shape corresponding to the sinusoidal wave driving signal is output from the inverter. As described above, since the sinusoidal wave driving signal is generated by performing the pulse width modulation with the sinusoidal waveform signal, the driving voltage becoming the sinusoidal waveform voltage is supplied to the coil of the motor 50. That is, the motor 50 is thus sinusoidal-wave-driven.

In the sinusoidal wave driving, it is possible to precisely set the various control parameters and driving parameters upon the speed control and sinusoidal wave driving. That is, the control is performed by the sinusoidal wave driving of the brushless DC motor, so that it is possible to improve the control performance and the low noise/high efficiency driving performance within a wide range of the rotating speed.

In this illustrative embodiment, even when the higher-level device outputs the operation command information in the serial data format and even when the higher-level device outputs the operation command information in the parallel data format, the motor driving device 21 is configured to cope with the corresponding operation command information. The communication path selection unit 22 is input with the operation command information in either one of the serial data format and the parallel data format. At this time, the operation command information is input to the communication path selection unit 22 through the common input path 13, irrespective of the serial/parallel data formats.

Figure 2:
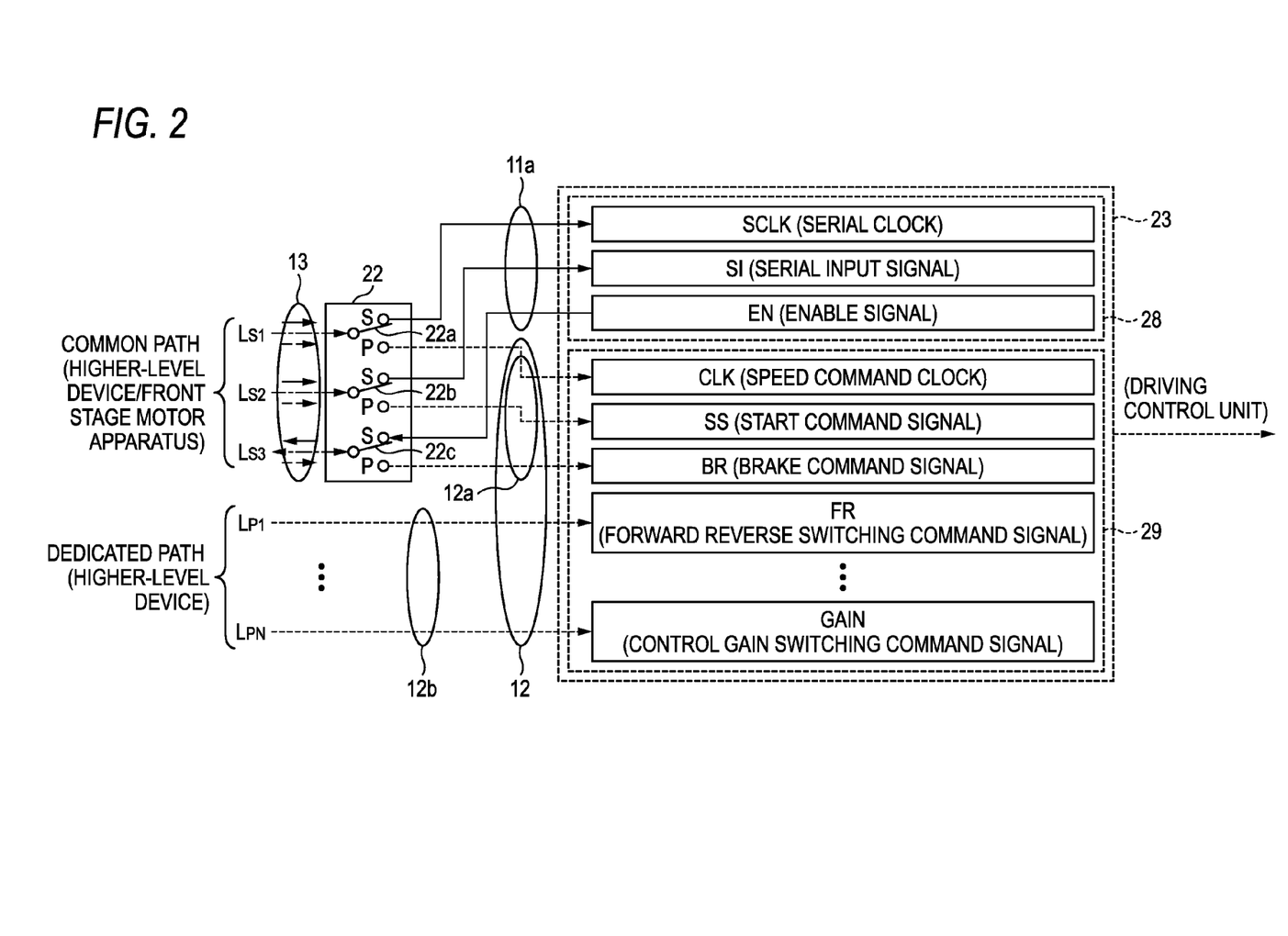
FIG. 2 is a block diagram showing configurations of a communication path selection unit and a communication unit.

FIG. 2 is a block diagram showing configurations of the communication path selection unit 22 and the communication unit 23.

As shown in FIG. 2, in this illustrative embodiment, the input path 13 includes three common paths LS1, LS2, LS3. The operation command information is input from the higher-level device and the like to the communication path selection unit 22 through the common paths LS1, LS2, LS3. That is, the common paths LS1, LS2, LS3 are common communication path among serial and parallel data.

The parallel communication path 12*b* which can be directly connected to the higher-level device includes N parallel dedicated paths LP1 to LPN (N: natural number). In the meantime, the number of the dedicated paths LP1 to LPN provided as the parallel communication path 12*b* may be appropriately set depending on the number of the signals of the operation command information having the parallel data format to be input, the number of the common paths provided as the input path 13, and the like.

The communication path selection unit 22 includes three switches 22*a*, 22*b*, 22*c*. As shown in FIG. 2, the respective switches 22*a*, 22*b*, 22*c* correspond to the respective common paths LS1, LS2, LS3. Each of the switches 22*a*, 22*b*, 22*c* switches the communication path between the communication path selection unit 22 and the communication unit 23, which is connected to the common paths LS1, LS2, LS3, into one of the serial communication path 11*a* and the parallel communication path 12*a*. Each of the switches 22*a*, 22*b*, 22*c* has a serial-side terminal S to which the serial communication path 11*a* is connected and a parallel-side terminal P to which the parallel communication path 12*a* is connected, and connects a terminal having the common path LS1, LS2, LS3 connected thereto to either one of those terminals.

The serial interface unit 28 is provided to input the operation command information in the serial data format to the communication unit 23. As shown in FIG. 2, the serial interface unit 28 includes interfaces corresponding to three signals. That is, the interfaces respectively correspond to a serial clock SCLK, a serial input signal SI and an enable signal EN. The serial clock SCLK, the serial input signal SI and the enable signal EN are respectively connected to the serial-side terminals S of the switches 22*a*, 22*b*, 22*c* through the serial communication path 11*a*.

Also, the parallel interface unit 29 is provided to input the operation command information in the parallel data format. The parallel interface unit 29 is provided with interfaces corresponding to N+3 signals. That is, the interfaces correspond to a speed command clock CLK, a start command signal SS, a brake command signal BR, a forward reverse switching command signal FR, a control gain switching command signal GAIN and the like. Among the interfaces, the speed command clock CLK, the start command signal SS and the brake command signal BR are respectively connected to the parallel-side terminals P of the switches 22*a*, 22*b*, 22*c* through the parallel communication path 12*a*. The other interfaces (the forward reverse switching command signal FR, the control gain switching command signal GAIN and the like) are connected with the parallel communication path 12*b* and can be directly input with a signal from the higher-level device through the parallel communication path 12*b*.

In this illustrative embodiment, the communication path selection unit 22 switches the switches 22*a*, 22*b*, 22*c*, thereby selecting either one of the serial communication path 11*a* and the parallel communication path 12*a*, as the signal output path from the communication path selection unit 22 to the communication path 23. Thereby, the communication path selection unit 22 outputs the input operation command information to either one of the serial interface unit 28 and the parallel interface unit 29 through the selected output path.

The signal output path from the communication path selection unit 22 to the communication unit 23 is selected depending on the data format of the operation command information input to the communication path selection unit 22. In this illustrative embodiment, the selection of the output path depending on the data format, i.e., the switching of the switches 22*a*, 22*b*, 22*c* is performed by a variety of methods. For example, the switches 22*a*, 22*b*, 22*c* may be switched in association with the setting of a setting switch and the like which can be operated by a user. Also, the switches 22*a*, 22*b*, 22*c* may be automatically switched, based on a signal transmitted from the higher-level device, the front stage motor apparatus and the like to the communication path selection unit 22.

The output path is selected in the communication path selection unit 22 as described above, so that when the operation command information input to the communication path selection unit 22 has the serial data format, the operation command information is input to the serial interface unit 28 through the serial communication path 11*a*. On the other hand, when the operation command information input to the communication path selection unit 22 has the parallel data format, the operation command information is input to the parallel interface unit 29 through the parallel communication path 12*a*.

When the higher-level device is a type of performing serial communication, i.e., the higher-level device outputs the operation command information in the serial data format, the operation command information is transmitted in the communication path selection unit 22 and the communication unit 23, as follows. That is, as the operation command information, the common paths LS1, LS2 become input paths of the serial clock SCLK and the serial input signal SI, and the enable signal EN is transmitted via the common path LS3 (in FIG. 2, refer to the solid line arrows following the common paths LS1, LS2, LS3). At this time, since the operation command information is the serial data format, the communication path selection unit 22 selects the serial communication path 11a, as the communication path (output path) connecting the communication path selection unit 22 and the communication unit 23. Thereby, the operation command information is input to the serial interface unit 28. That is, it is possible to transmit the operation command information between the higher-level device and the three interfaces of the serial clock SCLK, the serial input signal SI and the enable signal EN.

In the communication unit 23, the serial interface unit 28 becomes valid and the parallel interface unit 29 becomes invalid. The operation command information sent to the communication unit 23 is transmitted to the driving control unit 23 via the serial interface unit 28, as the driving control signal.

Figure 3:
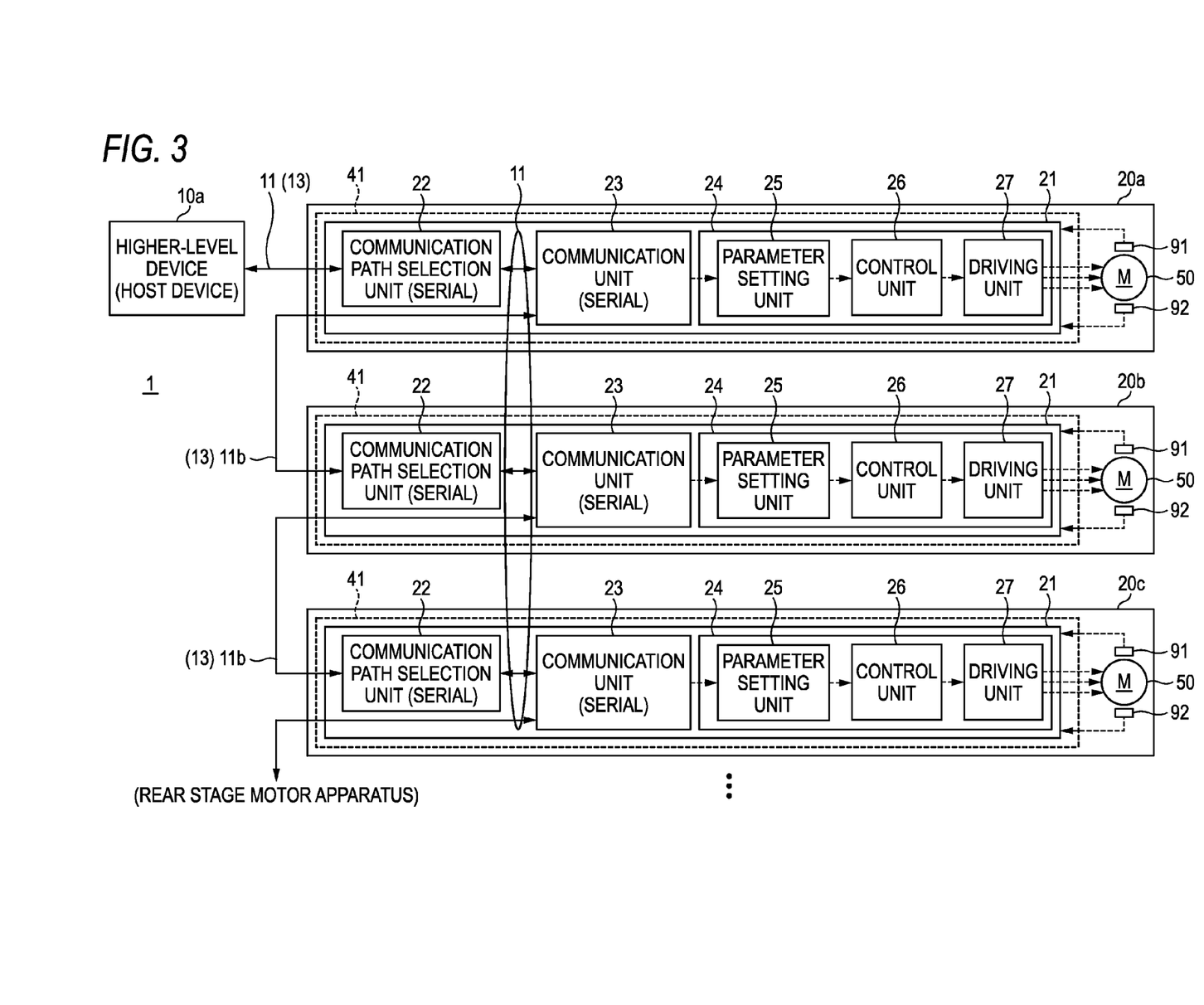
FIG. 3 is a block diagram showing an example of a motor driving system according to an illustrative embodiment of the present invention.

In the meantime, in a case where the serial communication is performed as described above, when the control of the motor apparatuses 20 is performed, the serial interface unit 28 and the rear stage motor apparatus 20 are connected to each other by the serial communication path 11b. In the serial communication path 11b, the serial clock or serial input signal is transmitted, as the operation command information, with the serial data format (an example is shown in FIG. 3).

On the other hand, when the higher-level device is a type of performing parallel communication, i.e., the higher-level device outputs the operation command information in the parallel data format, the operation command information is transmitted in the communication path selection unit 22 and the communication unit 23, as follows. That is, as the operation command information, the common paths LS1, LS2, LS3 become input paths of the speed command clock CLK, the start command signal SS and the brake command signal BR, respectively (in FIG. 2, refer to the dotted line arrows following the common paths LS1, LS2, LS3). At this time, since the operation command information has the parallel data format, the communication path selection unit 22 selects the parallel communication path 12a, as the communication path connecting the communication path selection unit 22 and the communication unit 23. Thereby, the operation command information input from the common paths LS1, LS2, LS3 to the communication path selection unit 22 is input to the parallel interface unit 29. That is, it is possible to transmit the operation command information between the higher-level device and the three interfaces of the speed command clock CLK, the start command signal SS and the brake command signal BR.

Here, the operation command information in the parallel data format output from the higher-level device includes the forward reverse switching command signal FR, the control gain switching command signal GAIN and the like, in addition to the speed command clock CLK, the start command signal SS and the brake command signal BR which can be input to the communication path selection unit 22. That is, in this case, the number of the signals of the operation command information in the parallel data format exceeds the number of the common input paths 13 (which means the number of the common paths LS1, LS2, LS3, and 3 in this case). At this time, among the signals of the operation command information, the signals which are not input to the communication path selection unit 22 by the three common paths LS1, LS2, LS3 are input from the higher-level device to the parallel interface unit 29 through the parallel dedicated paths LP1 to LPN. In other words, a part of the signals of the operation command information exceeding the number of the common paths LS1, LS2, LS3 is directly input to the communication unit 23 through the parallel communication path 12b without via the communication path selection unit 22.

When the operation command information is input to the parallel interface unit 29 as described above, in the communication unit 23, the serial interface unit 29 becomes invalid and the parallel interface unit 29 becomes valid. The operation command information sent to the communication unit 23 is transmitted to the driving control unit 23 via the parallel interface unit 29, as the driving control signal.

In the meantime, in a case where the parallel communication is performed as described above, when the control of the motor apparatuses 20 is performed, the operation command information is transmitted from the higher-level device to each motor apparatus 20.

As described above, in this illustrative embodiment, the motor apparatus 20 is includes the communication path selection unit 22 and the communication unit 23. Hence, even when the higher-level device performs the serial communication or parallel communication, it is possible to cope with each higher-level device by the motor apparatus 20 of one type.

In the meantime, the type of the signal of the operation command information of the motor apparatus 20 shown in FIG. 2, the allotment of the common paths LS1, LS2, LS3 and the parallel dedicated paths LP1 to LPN and the like are exemplary, and the present invention is not limited thereto. That is, the number and the type of the signals including the operation command information, the configurations of the input path 13 and the parallel communication path 12b and the like are appropriately set according to the specifications of the higher-level apparatus and the motor apparatus 20.

[Example of Configuration of Motor Driving System]

In the below, an example of the configuration of the motor driving system which is configured using the motor apparatus 20 of this illustrative embodiment is described.

The motor driving system can be configured using the motor apparatus 20 and the higher-level device which controls the motor apparatus 20. As the higher-level device, a device is used which outputs either one of the operation command information in the serial data format and the operation command information in the parallel data format to the motor apparatus 20. Thereby, the motor apparatus 20 is controlled by the higher-level device. The motor apparatus 20 is connected in parallel or in series with the higher-level device, depending on whether the higher-level device outputs the operation command information in the serial data format or the operation command information in the parallel data format.

In this illustrative embodiment, the motor driving system can be configured by the plurality of the motor apparatuses 20 and the higher-level devices smaller than the number of the motor apparatuses. In the motor driving system configured as described above, when the higher-level device outputs the operation command information in the serial data format, the plurality of the motor apparatuses 20 is connected to each other in series. On the other hand, when the higher-level device outputs the operation command information in the parallel data format, the plurality of the motor apparatuses 20 is connected to each other in parallel. In other words, in this illustrative embodiment, the motor apparatus 20 can be used together with the other motor apparatuses 20 connected in series or together with the other motor apparatuses 20 connected in parallel, so that it can cope with both serial and parallel transmission methods.

FIG. 3 is a block diagram showing an example of the motor driving system according to this illustrative embodiment.

FIG. 3 shows a motor driving system 1 using a higher-level device (host device) 10a which outputs the operation command information in the serial data format. The motor driving system 1 has the higher-level device 10a and the plurality of the motor apparatuses 20. In FIG. 3, among the motor apparatuses 20, three motor apparatuses (hereinafter, also referred to as a motor apparatus 20a, a motor apparatus 20b and a motor apparatus 20c) are shown.

As shown in FIG. 3, among the motor apparatuses 20, the input path 13 of the motor apparatus 20a, which is arranged at the front stage, becomes the serial communication path 11 connecting the higher-level device 10a and the communication path selection unit 22 each other. The motor apparatus 20a and the motor apparatus 20b which is arranged at the rear stage thereof are connected to each other by connecting the serial communication path 11b of the communication unit 23 of the motor apparatus 20a to the input path 13 of the motor apparatus 20b. Similarly, the motor apparatus 20b and the motor apparatus 20c which is arranged at the rear stage thereof are connected to each other by connecting the serial communication path 11b of the communication unit 23 of the motor apparatus 20b to the input path 13 of the motor apparatus 20c. The motor apparatuses 20 which are arranged at the rear stage of the motor apparatus 20c are also sequentially connected to the motor apparatuses 20 of the front stages thereof.

The communication path selection unit 22 of each motor apparatus 20 selects the serial communication path 11a as the output path to the communication unit 23. Thereby, the serial interface unit 28 operates in the communication unit 23 of each motor apparatus 20.

In the motor driving system 1, the communication path selection unit 22 of each motor apparatus 20 is input with the operation command information from the higher-level device 10a or motor apparatus 20 at the front stage thereof. In the communication path selection unit 22 of each motor apparatus 20, the serial communication path 11a is selected as the output path to the communication unit 23, so that the operation command information is input to the serial interface unit 28 of each motor apparatus 20. Thereby, the driving of each motor 50 is controlled according to the operation command information.

Figure 4:
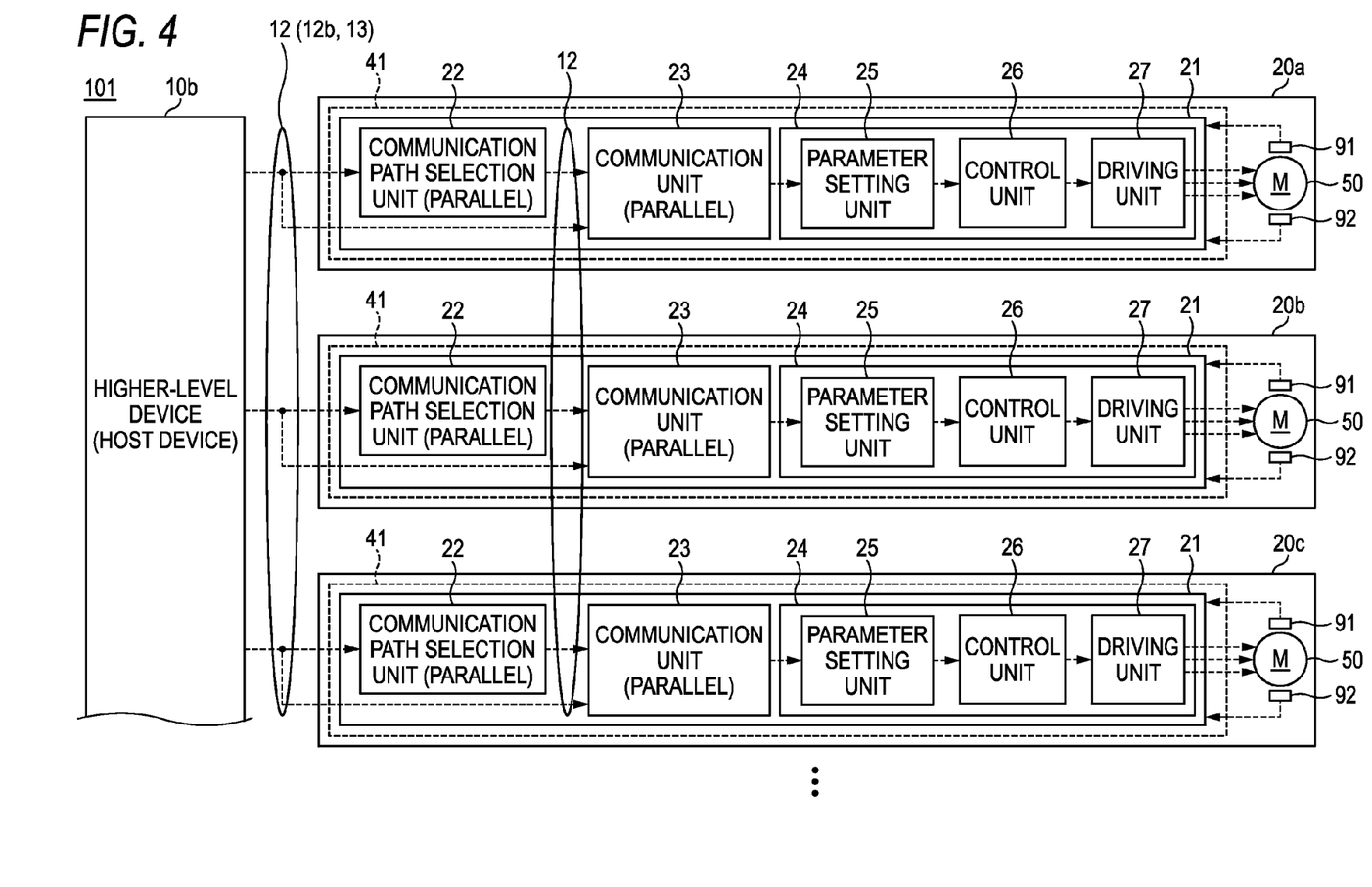
FIG. 4 is a block diagram showing another example of a motor driving system according to an illustrative embodiment of the present invention.

FIG. 4 is a block diagram showing another example of the motor driving system according to this illustrative embodiment of the present invention.

FIG. 4 shows a motor driving system 101 using a higher-level device (host device) 10b which outputs the operation command information in the parallel data format. The motor driving system 101 has the higher-level device 10b and the plurality of the motor apparatuses 20. In FIG. 4, among the motor apparatuses 20, three motor apparatuses are shown.

As shown in FIG. 4, the motor apparatuses 20 are connected with the higher-level device 10b in parallel. That is, the input path 13 and the parallel communication path 12b of each motor apparatus 20 become the parallel communication path 12 connecting the higher-level device 10b and the communication path selection unit 22 each other.

The communication path selection unit 22 of each motor apparatus 20 selects the parallel communication path 12a as the output path to the communication unit 23. Thereby, the parallel interface unit 29 operates in the communication unit 23 of each motor apparatus 20.

In the motor driving system 101, the communication path selection unit 22 of each motor apparatus 20 is input with a part of the operation command information from the higher-level device 10b. In the communication path selection unit 22 of each motor apparatus 20, the parallel communication path 12a is selected as the output path to the communication unit 23, so that the operation command information input to the communication path selection unit 22 is input to the parallel interface unit 29 of each motor apparatus 20. Also, among the operation command information output from the higher-level device 10b, the information which is not input to the communication path selection unit 22 is directly input to the parallel interface unit 29 through the parallel communication path 12b. Thereby, the driving of each motor 50 is controlled according to the operation command information.

That is, according to this illustrative embodiment, even when the operation command information input from the higher-level device has either of the serial data format and the parallel data format, it is possible to configure the motor driving system using the higher-level device by using the motor apparatus 20 having the motor driving device 21 of the same configuration. The motor apparatus 20 can cope with both the serial data format and the parallel data format. Hence, it is possible to reduce the manufacturing cost of the motor driving device 21, compared to a case where the motor driving device is used for the motor apparatuses having different configurations which comply with only one of the formats. Therefore, it is possible to reduce the manufacturing cost of the motor apparatus 20 using the motor driving device 21 and to suppress the manufacturing cost of the motor driving system 1, 101 and the like configured using the motor apparatus.

Also, the motor driving device 21 is packaged as one integrated circuit device 41. Therefore, it is possible to further reduce the manufacturing cost of the motor driving device 21. And, since it is possible to easily assemble the motor apparatus 20 by using the low-priced integrated circuit device 41, it is possible to further reduce the manufacturing cost of the motor apparatus 20. Further, since it is possible to make the motor driving device 21 smaller, it is possible to reduce the size of the motor apparatus 20.

[Modified Embodiments to First Illustrative Embodiment]

In the motor driving device 21 of the first illustrative embodiment, the circuit device implementing a part of the functions thereof may be packaged as one or more integrated circuit devices. Also, the circuit device implementing the whole functions of the motor driving device 21 may be packaged as a plurality of integrated circuit devices.

Figure 5:
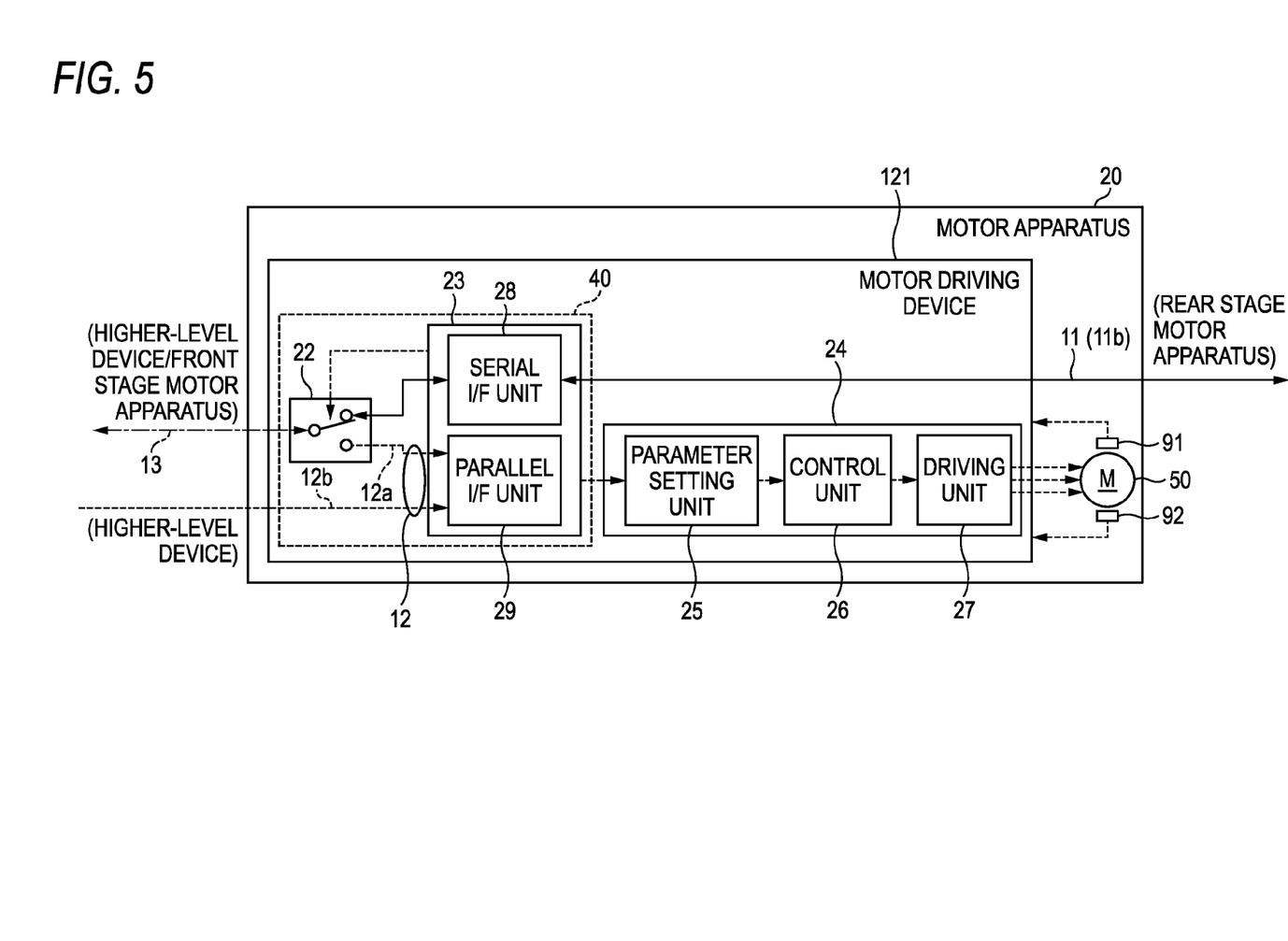
FIG. 5 is a block diagram showing a motor apparatus having a motor driving device according to a modified embodiment to the first illustrative embodiment.

FIG. 5 is a block diagram showing the motor apparatus 20 having a motor driving device 121 according to a modified embodiment to the first illustrative embodiment.

As shown in FIG. 5, the motor driving device 121 is different from the motor driving device 21 which is entirely packaged as the integrated circuit device 41, in that the communication path selection unit 22 and the communication unit 23 are packaged as one integrated circuit device 40. Although the driving control unit 24 is configured to adapt to the type of the motor 50 which is controlled by the motor driving device 121, the communication path selection unit 22 and the communication unit 23 may have the same configuration, irrespective of the type of the motor 50. That is, in this modified embodiment, since the integrated circuit device 40 can be used commonly in the motor driving device 121 for the motor 50 of the various types, it is possible to further reduce the manufacturing cost of the motor driving device 121.

In the meantime, a part of the circuit device configuring the motor driving device 121 may be further included in the integrated circuit device 40.

[Second Illustrative Embodiment]

In a second illustrative embodiment, the basic configuration of the motor apparatus is the same as that of the first illustrative embodiment. Thus, those descriptions thereof are omitted. The second illustrative embodiment is different from the motor apparatus of the first illustrative embodiment, in that the motor driving device is provided with a storage which is used for the operation of the communication path selection unit 22.

Figure 6:
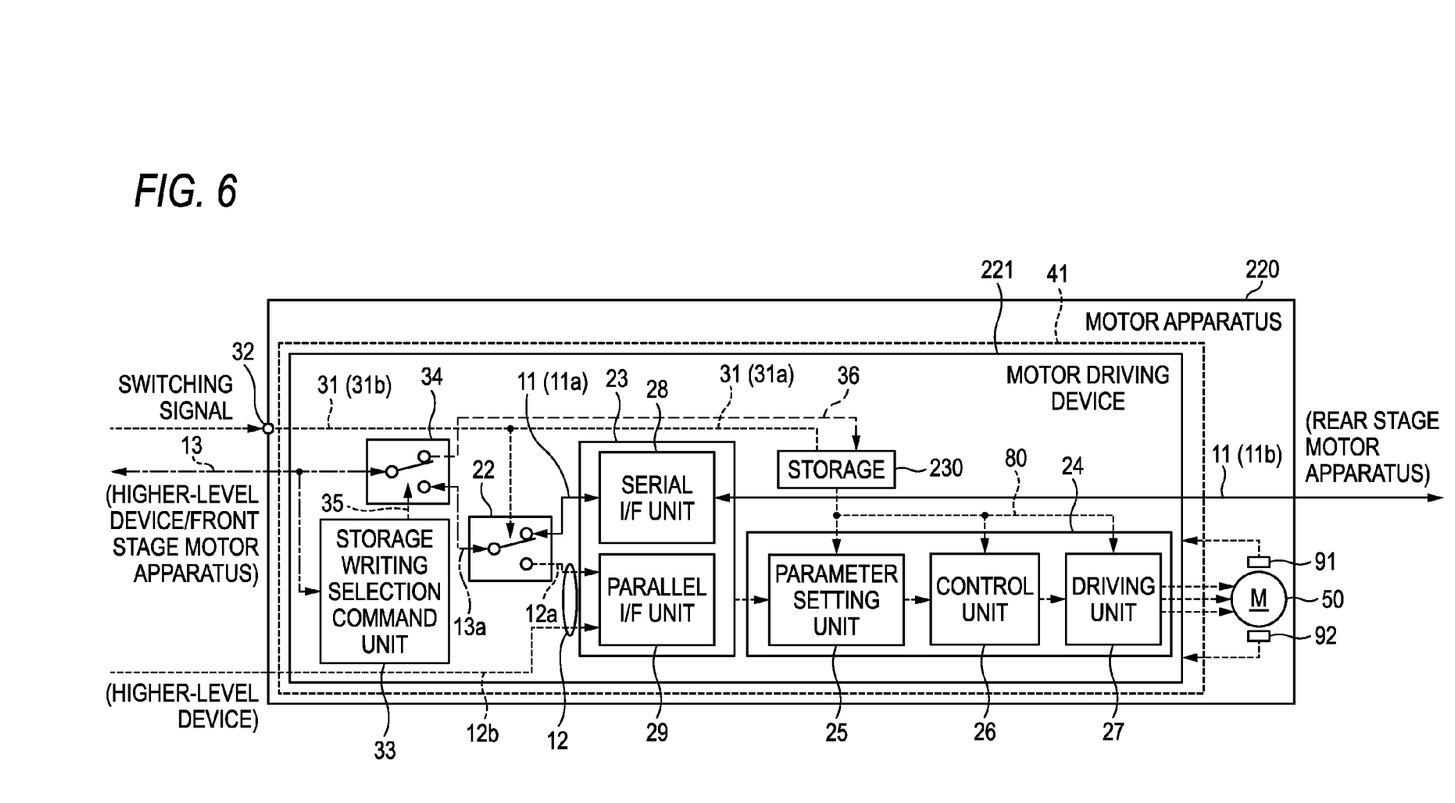
FIG. 6 is a block diagram showing a configuration of a motor apparatus having a motor driving device according to a second illustrative embodiment of the present invention.

FIG. 6 is a block diagram showing a configuration of a motor apparatus 220 having a motor driving device according to the second illustrative embodiment of the present invention.

Referring to FIG. 6, the motor apparatus 220 includes a motor driving device 221 having a different configuration from the motor driving device 21 of the motor apparatus 20 of the first illustrative embodiment. The motor driving device 221 has a storage or memory 230 in addition to the communication path selection unit 22, the communication unit 23 and the driving control unit 24. Also, the motor driving device 221 has an external communication terminal 32, a storage writing selection command unit 33 and a storage writing selection unit 34.

In the second illustrative embodiment, the input path 13 is connected to the storage writing selection command unit 33 and the storage writing selection unit 34. The storage writing selection command unit 33 and the storage writing selection unit 34 are connected to each other through a writing selection command path 35. The storage writing selection unit 34 and the communication path selection unit 22 are connected to each other through a transmission path 13a. The storage writing selection unit 34 and the storage 230 are connected to each other through a writing path 36. The communication path selection unit 22 is connected to each of the storage 230 and the external communication terminal 32 through a communication selection path 31. That is, the communication path selection unit 22 and the storage 230 are connected to each other through the communication selection path 31a. Also, the communication path selection unit 22 and the external communication terminal 32 are connected to each other through a communication selection path 31b.

The storage writing selection unit 34 selects (switches) a path to be connected to the input path 13 between the transmission path 13a and the writing path 36. When the storage writing selection unit 34 selects the transmission path 13a, the operation command information transmitted through the input path 13 is input to the communication path selection unit 22. That is, when the operation command information is input to the communication path selection unit 22, the operation command information is input to the communication path selection unit 22 via the storage writing selection unit 34.

In the second illustrative embodiment, the storage 230 stores communication path selection command information. The communication path selection command information is information which is used to enable the communication path selection unit 22 to select either one of the serial communication path 11 and the parallel communication path 12 and to keep the selected state when the motor apparatus 220 operates based on the control of the higher-level device. The communication path selection command information is transmitted from the storage 230 to the communication path selection unit 22 through the communication selection path 31a.

The communication path selection unit 22 selects, as the output path to the communication unit 23, either one of the serial communication path 11a and the parallel communication path 12a, based on the communication path selection command information stored in the storage 230. Thereby, based on the communication path selection command information, one of the serial interface unit 28 and the parallel interface unit 29 operates according to the data format of the operation command information, and the driving control signal is transmitted to the driving control unit 24. In the meantime, the communication path selection unit 22 may select, as the output path to the communication unit 23, either one of the serial communication path 11a and the parallel communication path 12a based on a switching signal transmitted from an external circuit and the like connected to the external communication terminal 32. At this time, when the switching signal is input from the external communication terminal 32 to the motor apparatus 220, it is transmitted to the communication path selection unit 22 through the communication selection path 31b.

Here, the communication path selection command information is stored in the storage 230, depending on the data format of the information input to the motor apparatus 220. The selection of the output path depending on the data format, i.e., the switching of the communication path selection unit 22 is made as follows, for example. When storing the communication path selection command information in the storage 230, information of a predetermined data format is input to the motor apparatus 220 through the input path 13. At this time, it can be said that the input information is special command information having a data format (for example, a power supply voltage inputs a special condition or special timing signal) different from the data format of the operation command information. The special command information is input by the serial communication, for example. When the special command information is input to the storage writing selection command unit 33, selection command information is output from the storage writing selection command unit 33. The selection command information is input to the storage writing selection unit 34 through the writing selection command path 35. When the selection command information is input, the storage writing selection unit 34 switches the path to be connected to the input path 13 into the writing path 36. In other words, when the special command information is input, the storage writing selection unit 34 switches the path, so that the motor driving device 221 becomes at a command information storing state different from the normal operating state at which the motor driving device controls the driving of the motor 50. At the command information storing state, the special command information is transmitted to the storage 230 through the writing path 36. In the storage 230, the communication path selection command information is written or updated, based on the special command information.

The motor driving device 221 performs communication through the input path 13 and the like, thereby writing or updating the communication path selection command information. Therefore, it is possible to suppress the manufacturing cost of the motor apparatus 220 without providing a dedicated interface for writing or updating the communication path selection command information. Also, since the state is switched shifted as described above and then the communication path selection command information is transmitted, it is possible to prevent a following problem in the second illustrative embodiment. That is, when the communication path selection command information is updated in the storage 230 at the normal operating state, the communication path selection unit 22 may not select a predetermined communication path. However, in the second illustrative embodiment, when the operation command information is transmitted from the higher-level device to the motor apparatus 220, the input path 13 and the writing path 36 are not connected by the storage writing selection unit 34. That is, at this time, since the communication path selection command information is not updated, the operation command information is securely transmitted to the communication unit 23.

That is, in the second illustrative embodiment, at the normal operating state, the communication path selection unit 22 selects the output path to the communication unit 23, based on the communication path selection command information stored in the storage 230 and the data format of the input operation command information. Since the selection of the output path is automatically made, the convenience of the motor apparatus 220 is further improved. Also, it is possible to easily change the communication path selection command information by inputting the special command information to the motor apparatus 220.

In the meantime, the storage 230 may store the information which is used for the control of the driving control unit 24, together with the communication path selection command information. In this case, as shown with an arrow 80 in FIG. 6, the information stored in the storage 230 may be transmitted from the storage 230 to the respective units of the driving control unit 24. Also, the storage 230 may be provided to the driving control unit 24 and may be configured to store the information which is used for the control of the driving control unit 24. In other words, the storage 230 which is used for the operation of the communication path selection unit 22 may be included in a separate storage of the driving control unit 24.

For example, the storage 230 may be provided as the parameter setting unit 25 which stores the parameters to be used for the control for driving the motor 50, as described above. In this case, the parameter setting unit 25 may store the communication path selection command information in a memory and the like, and the communication path selection unit 22 may select the path through which the operation command information is output to the communication unit 23, based on the communication path selection command information stored in the parameter setting unit 25. Even when the storage 230 is provided as the parameter setting unit 25, it is possible to configure the interface which can write or update the communication path selection command information by the input special command information.

That is, since the storage 230 is provided to the driving control unit 24, it is not necessary to provide a dedicated storage for storing the communication path selection command information. Accordingly, it is possible to further reduce the manufacturing cost of the motor driving device 221 and to automatically select the output path of the operation command information to the communication unit 23.

In the meantime, the storage 230 may be included in one of the constitutional elements of the motor driving device 221 instead of the driving control unit 24, and may be provided as a part of the storage storing the information to be used for the other control.

The interface which can write or update the communication path selection command information by the input special command information may be also used to write or update the parameter and the like to be used for the control for driving the motor 50.

[Effects of Illustrative Embodiments]

According to the motor driving device configured as described above, following effects are obtained. That is, the motor driving device can cope with either of the operation command information in the serial data format and the operation command information in the parallel data format. Hence, even when the operation command information of the higher-level device is data transmitted in the serial data format or parallel data format, it is possible to commonly use the motor driving device having the same configuration in any case. In other words, the motor driving device can be commonly used among a plurality of higher-level devices outputting the operation command information in different data format while it does not exclude the specific data format regarding the operation command information input from the higher-level device. Hence, it is possible to reduce the manufacturing cost of the motor driving device.

Also, since some communication paths can be used in two or more ways in the motor driving device, the circuit size of the motor driving device is not increased beyond necessity. Thus, it is possible to reduce the size (space saving) of the configuration of the motor apparatus or motor driving system using the same.

Also, since a part or whole of the motor driving device is integrated and configured as the integrated circuit device, it is possible to further reduce the manufacturing cost of the motor driving device and to further reduce the size of the configuration of the motor apparatus or motor driving system using the same.

[Others]

The motor driving device is not limited to the sinusoidal wave driving and may be configured to perform a rectangular wave driving. The number of the motor phases is not limited to three phases. The motor which is used in the motor apparatus, i.e., the motor which is driven by the motor driving device is not limited to the brushless DC motor and a variety of types can be used.

It should be construed that the illustrative embodiments are just exemplary and not limitative. The scope of the present invention is defined in the claims, not the specification, and is intended to include all modifications within the claims and the equivalent meaning thereto.

What is claimed is:

1. A motor driving device comprising:
   a communication path selection unit including a single common input path which receives, from an external device outside of the motor driving device, operation command information for controlling driving of a motor in both of a serial data format and a parallel data format, but not simultaneously;
   a communication unit which includes a serial interface unit which receives the operation command information from the communication path selection unit in the serial data format, and a parallel interface unit which receives the operation command information from the communication path selection unit in the parallel data format, and which outputs a driving control signal based on the operation command information input via the communication path selection unit;
   a driving control unit which controls driving of the motor based on the driving control signal output from the communication unit;
   a storage which stores communication path selection command information based on the data format of the input operation command information;
   a storage writing selection unit which receives information including the operation command information and special command information from the external device and outputs the received information to one of the communication path selection unit and the storage; and
   a storage writing selection command unit which controls the storage writing selection unit to output the received information to the communication path selection unit when the received information is the operation command information and controls the storage writing selection unit to output the received information to the storage when the received information is the special command information,
   wherein the communication path selection unit further includes an output path to the serial interface unit and an output path to the parallel interface unit, and selects which one of the output paths to use for outputting the operation command information which has been input to the single common input path, based on the data format of the operation command information and the communication path selection command information stored in the storage, and outputs the input operation command information to either one of the serial interface unit and the parallel interface unit through the selected output path, and wherein one of the serial interface unit and the parallel interface unit outputs the driving control signal to the driving control unit based on the input operation command information received through the selected output path.

2. The motor driving device according to claim 1,
wherein the storage further stores information which is provided to the driving control unit for controlling operation of the driving control unit.

3. The motor driving device according to claim 1, further comprising another input path for inputting the operation command information from the external device outside the motor driving device directly to the communication unit without being routed through the communication path selection unit, wherein when a number of signals of the operation command information in the parallel data format exceeds a number of the common input path, a part of the signals of the operation command information in the parallel data format is directly input to the communication unit through the other input path.

4. An integrated circuit device comprising one or more of integrated circuits which implement a part or a whole of the motor driving device according to claim 1.

5. The integrated circuit device according to claim 4,
wherein one said integrated circuit implements at least the communication path selection unit and the communication unit.

6. The integrated circuit device according to claim 4,
wherein one said integrated circuit implements a whole of the motor driving device.

7. A motor apparatus comprising:
a motor; and
the motor driving device according to claim 1,
wherein the motor driving device controls driving of the motor based on operation command information which is input to the motor driving device from the external device outside the motor driving device.

8. A motor driving system comprising:
the motor apparatus according to claim 7; and
a higher-level device which controls the motor apparatus,
wherein the higher-level device outputs either one of the operation command information in the serial data format and the operation command information in the parallel data format, to the motor apparatus for controlling the motor apparatus.

9. The motor driving device according to claim 1, wherein the communication path selection command information is input in a predetermined data format via the common input path and stored in the storage.

* * * * *